US 6,665,752 B1

(12) United States Patent
Bernath et al.

(10) Patent No.: US 6,665,752 B1
(45) Date of Patent: Dec. 16, 2003

(54) INTERRUPT DRIVEN INTERFACE COUPLING A PROGRAMMABLE MEDIA ACCESS CONTROLLER AND A PROCESS CONTROLLER

(75) Inventors: Brett A. Bernath, San Diego, CA (US); Sahil Bansal, San Diego, CA (US); Moshe Goldenberg, St. Karmiel (IL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/516,465

(22) Filed: Mar. 1, 2000

Related U.S. Application Data

(60) Provisional application No. 60/183,130, filed on Feb. 17, 2000.

(51) Int. Cl.$^7$ ................................................ G06F 3/00
(52) U.S. Cl. ........................ 710/52; 710/200; 710/260; 709/200
(58) Field of Search ............................... 710/8, 10, 11, 710/56, 52, 200, 260; 709/200

(56) References Cited

U.S. PATENT DOCUMENTS

| 5,107,456 A | * | 4/1992 | Schuur ........................ 710/305 |
| 5,367,563 A | * | 11/1994 | Sainton ..................... 379/93.29 |
| 5,463,616 A | * | 10/1995 | Kruse et al. ................ 370/276 |
| 5,551,005 A | * | 8/1996 | Sarangdhar et al. ......... 711/145 |
| 5,625,775 A | * | 4/1997 | Davis et al. ................ 709/227 |
| 5,748,634 A | * | 5/1998 | Sokol et al. ................. 370/402 |
| 5,870,609 A | * | 2/1999 | Thornton et al. ........... 717/175 |
| 5,991,820 A | * | 11/1999 | Dean ........................... 709/312 |
| 6,434,636 B1 | * | 8/2002 | Van Gaasbeck ............. 710/33 |
| 6,453,375 B1 | * | 9/2002 | Derr et al. .................. 710/200 |
| 6,493,780 B2 | * | 12/2002 | Hsu ............................ 710/260 |

OTHER PUBLICATIONS

"Data–Over–Cable Service Interface Specifications," *Radio Frequency Interface Specification SP–RFI–I05–991105*, Copyright 1999 Cable Television Laboratories, Inc., (214 pp.).

* cited by examiner

*Primary Examiner*—Kim Huynh
*Assistant Examiner*—Harold Kim
(74) *Attorney, Agent, or Firm*—Christopher J. Rourk; Akin Gump Strauss Hauer & Feld, LLP

(57) ABSTRACT

An interrupt driven interface coupling a programmable media access controller (MAC) and a process controller. The interrupt driven interface is operable within a cable modem system. The specification by which the cable modem operates to transfer data between the programmable media access controller (MAC) and the control processor is loaded into a memory location within the system, and the physical system is operable to provide for backward compatibility, in that, the addition of new messages and the deletion of old messages within the specification is performed via software upgrade. The necessity of a re-design and re-fabrication of the programmable media access controller (MAC) and the control processor, and the interface between them is completely obviated by the present invention.

19 Claims, 7 Drawing Sheets

INTERRUPT DRIVEN INTERFACE COUPLING A PROGRAMMABLE MEDIA ACCESS CONTROLLER AND A PROCESS CONTROLLER

CROSS-REFERENCE TO RELATED APPLICATIONS

The present application is based on and claims priority to U.S. Provisional Application Ser. No. 60/183,130 entitled "Cable Modem Having a Programmable Media Access Controller", filed Feb. 17, 2000.

The following applications are hereby incorporated herein by reference in their entirety and made part of the present application for all purposes:

1) U.S. Pat. No. 6,532,511, entitled "Asochronous Centralized Multi-Channel DMA Controller," issued Mar. 11, 2003; and 2) U.S. Pat. No. 6,442,642, entitled "System And Method For Providing An Improved Synchronous Operation Of An Advanced Peripheral Bus With Backward Compatibility," issued Aug. 27, 2002.

BACKGROUND

1. Technical Field

The present invention relates generally to interfacing between various processing circuitry employing media access control; and, more particularly, it relates to interrupt driven interfacing between a media access controller and a process controller.

2. Related Art

Conventional media access controllers (MACs) do not provide for upgradability to new specifications as new functionality is provided therein. Under traditional methods integrated circuitry that employs a media access controller (MAC), when a new specification is released to accommodate different data in a new manner, the media access controller (MAC) and the interfacing between the media access controller (MAC) and other control circuitry of a system must be redesigned in light of the hardware modification that must be performed to accommodate the data in compliance with the new specification. This inherent requirement for re-design and fabrication of the circuitry that performs the interfacing between the media access controller (MAC) and the other control circuitry in the system is very costly in terms of time and money. Not only must the design be performed, that requires a large amount of time in terms of engineering and fabrication, but the new circuitry must be installed within the system to perform properly on the data using the newly prescribed specification. For embedded systems, this "upgrading" of the new hardware, to be able to accommodate the new specification, will often lead to a total replacement of the integrated circuitry that contains the media access controller (MAC). The hard wired configuration of such conventional systems that perform media access control does not lend itself to easy upgradability to new specification that control the proper handling of data interfacing between various circuitry within the system employing media access control. The messages that govern the manner in which the data is transmitted and handled between the various circuitry are often modified with the introduction of a new specification. For example, when new messages are used within the specification to control the transportation of data between the various circuitry, the inability of the conventional interfacing between a media access controller (MAC) and a process controller typically necessarily requires a re-design and re-fabrication of an entirely new system, not only a re-design and re-fabrication of the interface itself.

In addition, the interfacing between the media access controller (MAC), between either a newly designed media access controller (MAC) to accommodate the new specification and a control processor or between a traditional media access controller (MAC) and a control processor, is oftentimes performed using conventional methods of polling and recurrent status detection between the various circuitry within the system. That is to say, in order to transfer data in the properly prescribed format between various portions of the system, as defined by the current specification in the media access control community, the transfer is typically performed using conventional polling and status detection circuitry that continually determines the existence of data among the various circuitry within the system performing media access control. The conventional solution of performing interfacing between the various circuitry is inherently slow, in that, it is primarily polling driven and inherently requires a large amount of bandwidth, in that, the detection of the status and the existence of data to be transferred between the various circuitry and processors is performed on a clock by clock basis, or almost nearly on a clock by clock basis. The conventional solution is consumptive in terms of bandwidth and hardware.

The conventional method of interfacing between the media access controller (MAC) and other control processor circuitry within the system performs the interfacing in such a way that the data is not necessarily protected during its transport between the various devices within the system. For example, in the event that read and write commands are executed simultaneously, there is a possibility that the data contained within these commands may be corrupted or overwritten thereby resulting in a significantly reduced performance of the overall system. Such data losses are undesirable in terms not only of system performance but also of user friendliness.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a cable modem system that interfaces at least two processors to transfer data between the at least two processors. The cable modem system includes a first processor, a second processor, a memory, a semaphore circuitry, and an interrupt control circuitry. All of these elements are communicatively coupled with a bus. The memory stores a specification within a portion of the memory, and that specification governs the transfer of the data between the first processor and the second processor. Depending of the specific application that is being performed, either the first processor or the second processor writes the data to another portion of the memory. The semaphore circuitry determines which of the first processor and the second processor is to write the data to the other portion of the memory, and the interrupt control circuitry notifies the other of either the first processor or the second processor to read the data from the other portion of the memory.

In certain embodiments of the invention, the memory is, at least in part, a flash memory and the specification is stored within the flash memory. The memory is, at least in part, a random access memory, the random access memory is partitioned into a number of buffers wherein each of the number of buffers having a size and a location. The size and the location of each of the number of buffers is adjustable to conform with the specification. If desired, the specification is loaded into the memory using an external and portable media such as a floppy disk or a CD ROM. In some embodiments of the invention, the first processor and the second processor are embedded within a single circuitry. In others, they are separated and connected via an external bus structure. The first processor is contained within a cable modem, and the second processor is contained within a peripheral device wherein each of the cable modem and the peripheral device are communicatively coupled via the bus. The first processor and the second processor are each operable to perform a number of different processes that are defined by the specification.

Other aspects of the present invention can be found in an interrupt driven interface that couples a programmable media access controller (MAC) and a control processor for data transfer between them. The interrupt driven interface contains a memory, an interrupt control circuitry, and a bus that communicatively coupled the memory, the interrupt control circuitry, the programmable media access controller (MAC), and the control processor. The memory stores the data, and the data is transferred to the memory by either the programmable media access controller or the control processor. The interrupt control circuitry notifies the other of the programmable media access controller or the control processor to read the data from the memory after the transfer of the data to the memory.

In certain embodiments of the invention, the data is transferred to the memory by one of the programmable media access controller and the control processor after either the programmable media access controller or the control processor acquires a semaphore. A specification is stored within the memory, and the specification is downloaded from an external network. The control processor contains a message processor, and the message processor is operable to interpret a number of messages that are defined within the specification. The memory is partitioned into a number of buffers, each of the buffers has a size and a location. That is adjustable to conform with the specification.

Other aspects of the present invention can be found in a method to interface a programmable media access controller and a control processor. The method includes requesting a semaphore, writing data into a memory, releasing the semaphore, issuing an interrupt, requesting another semaphore, reading the data from the memory, and releasing the other semaphore.

In certain embodiments of the invention, the method also includes processing the semaphore to determine whether to write the data to the memory. If desired, it is further determined whether the semaphore is granted during the requesting of the semaphore, and if it is not granted, the a wait period of time is passed before performing an additional request of the semaphore. The method is operable to interface multiple device including the programmable media access controller, the control processor, and an additional processor. The method is operable to be performed within a cable modem system.

Other aspects, advantages and novel features of the present invention will become apparent from the following detailed description of the invention when considered in conjunction with the accompanying drawings.

DETAILED DESCRIPTION OF THE INVENTION

Figure 1:
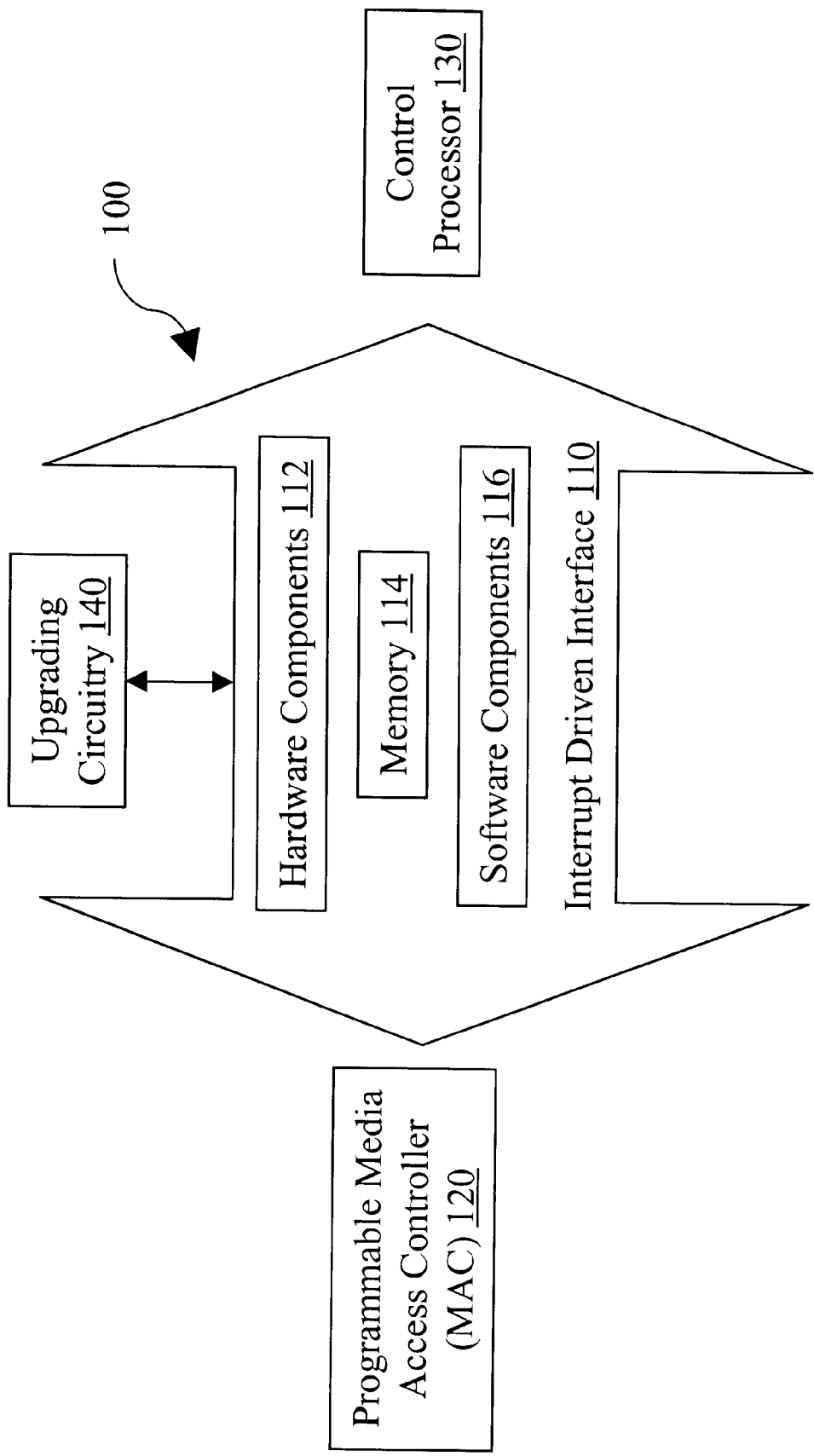
FIG. 1 is a system diagram illustrating an embodiment of a system employing an interrupt driven interface that couples a programmable media access controller (MAC) and a control processor in accordance with the present invention.

FIG. 1 is a system diagram illustrating an embodiment of a system 100 employing an interrupt driven interface 110 that couples a programmable media access controller (MAC) 120 and a control processor 130 in accordance with the present invention. The interrupt driven interface 110 itself contains, among other things, a number of hardware components 112, a memory 114, and a number of software components 116. The interrupt driven interface 110 is any number of physical communication media in various embodiments of the invention, including a bus, a wirleline network, and a wireless network. In addition, the system 100 employs an upgrading circuitry 140 that is communicatively coupled to the interrupt driven interface 110 to perform modification of the specification in which the interrupt driven interface 110 operates in transmitting data between the programmable media access controller (MAC) 120 and the control processor 130.

For example, when the specification of communication and handling of various data types is modified upon the release of a new specification, such as the Data Over Cable Service Interface Specification (DOCSIS), or another specification published by the Institute for Electrical and Electronics Engineers (IEEE), the Multimedia Cable Network Systems (MCNS) consortium, or some other technical committee overseeing and directing development in cable modem technology, the upgrading circuitry 140 is operable to download that newly released specification to the interrupt driven interface 110 such that the programmable media access controller (MAC) 120 and the control processor 130 are operable to communicate and transfer data using the new specification. The ability to accommodate a new specification without having to do a complete redesign and refabrication of the interrupt driven interface 110 provides the desired functionality of backward compatibility and allowing for the simplified re-definition of the messages contained within new specifications.

In certain embodiments of the invention, the interrupt driven interface 110 employs various portions of the memory 114 to operate as first in/first out (FIFO) buffers to control the transportation of data between the programmable media access controller (MAC) 120 and the control processor 130. In addition, the memory is operable to contain the software components, 116 that properly perform data handling and transfer using the proper specification. Also, the hardware components 112 include interrupt control status registers, interrupt control logic circuitry, and other circuitry to perform the data transfer. The software components 116 are operable to perform the data transfer using the proper specification.

Figure 2:
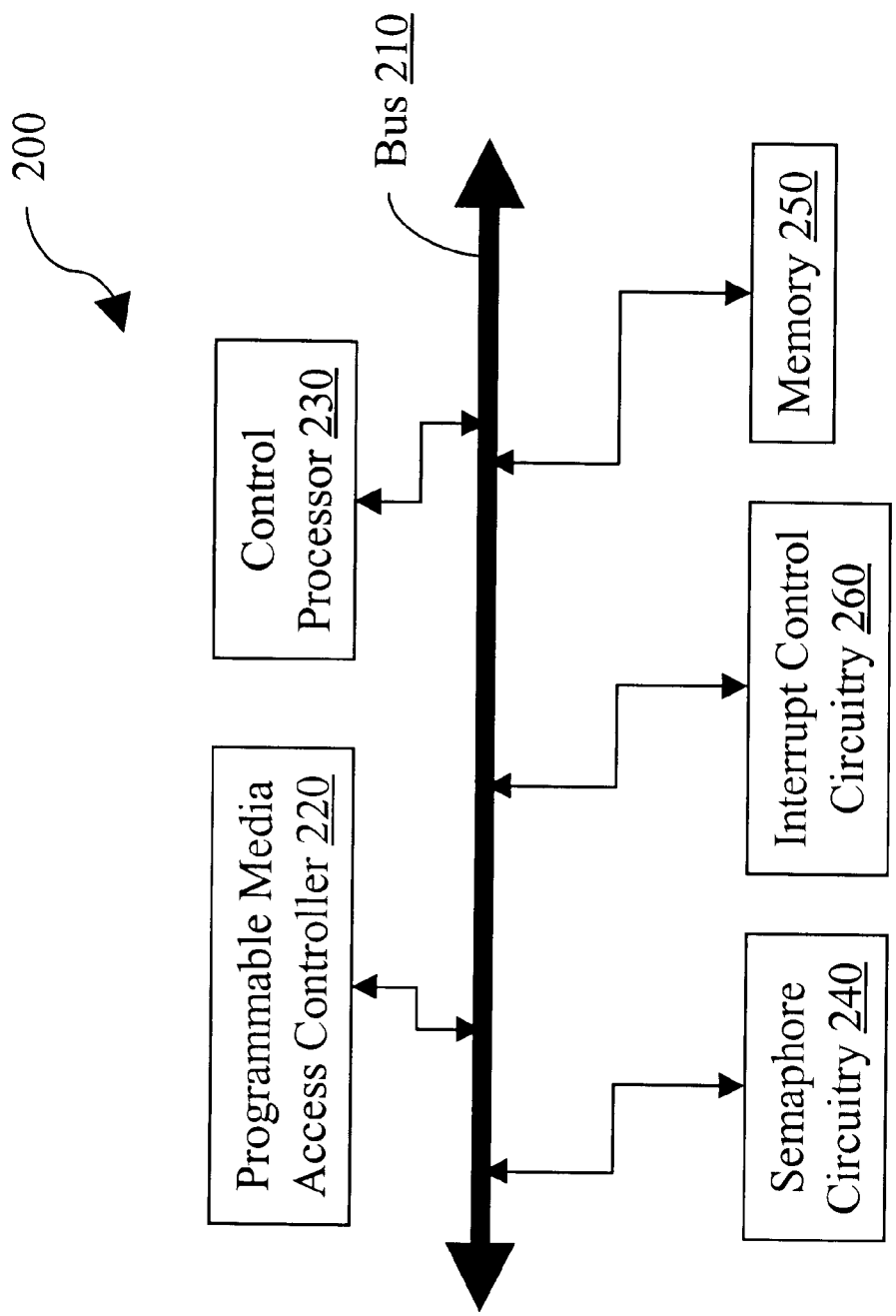
FIG. 2 is a system diagram illustrating another embodiment of a system employing an interrupt driven interface that couples a programmable media access controller (MAC) and a control processor in accordance with the present invention.

FIG. 2 is a system diagram illustrating another embodiment of a system 200 employing an interrupt driven interface that couples a programmable media access controller (MAC) 220 and a control processor 230 in accordance with the present invention. The programmable media access controller (MAC) 220 and the control processor 230 are each communicatively coupled to a bus 210. In addition, a semaphore circuitry 240, an interrupt control circuitry 260, and a memory 250 are also communicatively coupled to the bus 210. The semaphore circuitry 240 employs, among other things, active circuitry that performs arbitration between the programmable media access controller (MAC) 220 and the control processor 230 so that data is transferred between them according to the proper specification in accordance with a specification provided by any of the technical groups as mentioned above in FIG. 1. For example, in the instance when the programmable media access controller (MAC) 220 and the control processor 230 are communicatively coupled via the bus 210 within the system 200 when the system 200 is a cable modem, the specification that governs the transportation of data between the programmable media access controller (MAC) 220 and the control processor 230 across the bus 210 is performed in accordance with that specification so that the system 200 is completely operable with any network that supports present day cable modem technology and its associated communication standards.

Similar to the embodiment of the invention illustrated above in FIG. 1, the memory 250 employs various of its portions to operate as first in/first out (FIFO) buffers to handle the passing of data between the programmable media access controller (MAC) 220 and the control processor 230. The specific location of the first in/first out (FIFO) buffers within the memory 250 is deterministic and flexible. When the specification by which the system 200 operates is modified, for example upon the release of a new specification, the size of the first in/first out (FIFO) buffers within the memory 250 is similarly modified to handle a potentially varied amount of data transfer within a given data transfer between the programmable media access controller (MAC) 220 and the control processor 230. The interrupt control circuitry 260 assists the semaphore circuitry 240 in performing the transfer of data between the programmable media access controller (MAC) 220 and the control processor 230. For example, the semaphore circuitry 240 controls when either one of the media access controller (MAC) 220 or the control processor 230 performs a write function to the bus 210. When the write function is completed by either the programmable media access controller (MAC) 220 or the control processor 230, the semaphore circuitry 240 then invokes the interrupt control circuitry 260 to initiate the control processor 230 or the programmable media access controller (MAC) 220 then to perform a read function to the bus 210, to extract the data that is written into one of the first in/first out (FIFO) buffers contained within the memory 250.

One example of this action is illustrated as follows. When the programmable media access controller (MAC) 220 is to perform a write function, it invokes the semaphore circuitry 240. If the semaphore circuitry 240 grants the bus 210 to the programmable media access controller (MAC) 220, then the write command is performed and data is transferred to a selected first in/first out (FIFO) buffer located within the memory 250. After the entire write command is performed, then the semaphore circuitry 240 releases the bus and issues an interrupt signal using the interrupt control circuitry 260; the interrupt signal is received by the control processor 230. The control processor then is to perform a read command to extract the recently written data from the selected first in/first out (FIFO) buffer located within the memory 250. After the control processor 230 has read all of the data from the first in/first out (FIFO) buffer located within the memory 250, then the bus is released using the semaphore circuitry 240. The converse order of operation is performed when the control processor 230 is to transfer data to the programmable media access controller (MAC) 220.

The interrupt control circuitry 260 provides an efficient method to notify each of the programmable media access controller (MAC) 220 and the control processor 230 when there is data to be read from the first in/first out (FIFO) buffer located within the memory 250. This provides a very fast, low bandwidth method to conserve processing resources within the system 200. The bus 210 is any number of communication media including an internal bus within a computing system, an external network such as intranet or internet, and any media type is operable as the bus 210 without departing from the scope and spirit of the invention. Examples of physical media type operable with the invention include wireline, wireless, fiber-optic, and other physical forms of communication media. In addition, the programmable media access controller (MAC) 220 and the control processor 230 need not necessarily be contained within a single device. For example, in certain embodiments of the invention, the control processor 230 is a control processor of a motherboard and the programmable media access controller (MAC) 220 is contained within a cable modem of a computing system. In other embodiments of the invention, the programmable media access controller (MAC) 220 and the control processor 230 are contained within a single, integrated circuit that are communicatively coupled via the bus 210 that is itself contained on the integrated circuit. Alternatively, the control processor 230 is a control processor contained within any other peripheral device that is operable in conjunction with the programmable media access controller (MAC) 220, wherein the bus 210 communicatively couples the two devices.

Figure 3:
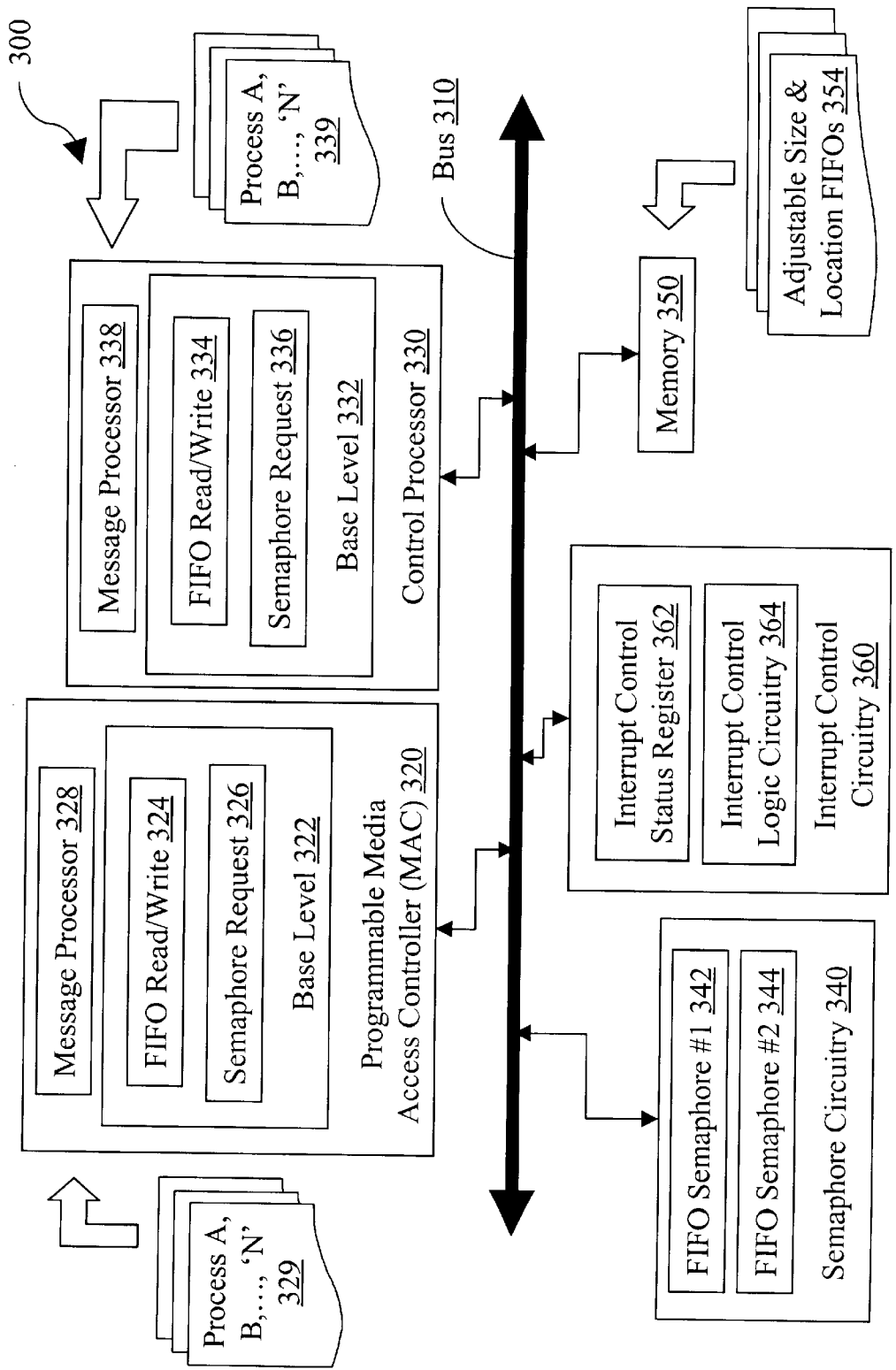
FIG. 3 is a system diagram illustrating another embodiment of a system employing an interrupt driven interface that couples a programmable media access controller (MAC) and a control processor in accordance with the present invention.

FIG. 3 is a system diagram illustrating another embodiment of a system 300 employing an interrupt driven interface that couples a programmable media access controller (MAC) 320 and a control processor 330 in accordance with the present invention. The programmable media access controller (MAC) 320 and the control processor 330 are each communicatively coupled to a bus 310. In addition, a semaphore circuitry 340, an interrupt control circuitry 360, and a memory 350 are also communicatively coupled to the bus 310. The memory 350 itself contains a number of adjustable size and location first in/first out (FIFOs) buffers 354. The semaphore circuitry 340 employs, among other things, active circuitry that performs arbitration between the programmable media access controller (MAC) 320 and the control processor 330 so that data is transferred between them according to the proper specification in accordance with a specification provided by any of the technical groups as mentioned above in FIG. 1 as well as within the discussion of FIG. 2. For example, in the instance when the programmable media access controller (MAC) 320 and the control processor 330 are communicatively coupled via the bus 310 within the system 300 when the system 300 is a cable modem, the specification that governs the transportation of data between the programmable media access controller (MAC) 320 and the control processor 330 across the bus 310 is performed in accordance with that specification so that the system 300 is completely operable with any network that supports present day cable modem technology and its associated communication standards.

The programmable media access controller (MAC) 320 itself contains, among other things, a base level 322 and a message processor 328. The base level 322 of the programmable media access controller (MAC) 320 is operable to perform a semaphore request 326 and a first in/first out (FIFO) read/write command 324. Similarly, the control processor 330 itself contains, among other things, a base level 332 and a message processor 338. The base level 322 of the control processor 330 is operable to perform a semaphore request 336 and a first in/first out (FIFO) read/write command 334.

The message processor 328 of the programmable media access controller (MAC) 320 is operable to accommodate any number of different processes A, B, . . . , 'N' 329. Similarly, the message processor 338 is operable to accommodate any number of different processes A, B, . . . , 'N' 339. The message processors 328 and 338 are operable to perform the interpretation of messages received from the different processes A, B, . . . , 'N' 329 and 339 so that the data management, handling, and transfer between the programmable media access controller (MAC) 320 and the control processor 330 is performed according to the proper specification. For example, the specification governs items such as the header, data type, and other parameters embedded within the data. The message processors 328 and 338 are operable to interpret any embedded information contained within the data using the messages received that are associated with the different processes A, B, . . . , 'N' 329 and 339.

When the programmable media access controller (MAC) 320 is to perform a write function, the base level 322 issues the first in/first out (FIFO) read/write 324 command to the bus 310. When this is performed, a semaphore request 326 is made to the semaphore circuitry 340. In the specific embodiment of the invention illustrated within FIG. 3, the semaphore circuitry 340 contains a first in/first out (FIFO) semaphore #1 342 and a first in/first out (FIFO) semaphore #2 344, each being dedicated to one of the programmable media access controller (MAC) 320 and the control processor 330. When the semaphore request 326 is made, the first in/first out (FIFO) semaphore #1 342 is sought. If the first in/first out (FIFO) semaphore #1 342 is granted, then the programmable media access controller (MAC) 320 performs the first in/first out (FIFO) read/write 324 to one of the adjustable size and location first in/first out (FIFOs) buffers 354. After the first in/first out (FIFO) read/write 324 is completely performed, then the first in/first out (FIFO) semaphore #1 342 is released, and the interrupt control circuitry 360 sets a status bit that is located within an interrupt control status register 362.

Subsequently, the interrupt control circuitry 360, using an interrupt control logic circuitry 364, issues an interrupt signal to the control processor 330. When the control processor 330 receives the interrupt signal, it issues the first in/first out (FIFO) read/write 334 command to the bus 310. Subsequently, the semaphore request 336 is made to the semaphore circuitry 340. When the semaphore request 336 is made, the first in/first out (FIFO) semaphore #2 344 is sought. If the first in/first out (FIFO) semaphore #2 344 is granted, then the control processor 330 performs the first in/first out (FIFO) read/write 334 and reads the recently written data contained within the one of the adjustable size and location first in/first out (FIFOs) buffers 354 that has just been written by the programmable media access controller (MAC) 320 above. After the reading is completely performed and all of the data is extracted from the one of the adjustable size and location first in/first out (FIFOs) buffers 354, the status bit contained within the interrupt control status register 362 is cleared, and the first in/first out (FIFO) semaphore #2 344 is released. The control processor 330 and the programmable media access controller (MAC) 320 then wait for a next message associated with any one of the different processes A, B, . . . , 'N' 329 and 339.

The converse is performed when the control processor 330 is to perform a write function. The base level 332 issues the first in/first out (FIFO) read/write 334 command to the bus 310. When this is performed, a semaphore request 336 is made to the semaphore circuitry 340. When the semaphore request 336 is made, the first in/first out (FIFO) semaphore #2 344 is sought. If the first in/first out (FIFO) semaphore #2 344 is granted, then the control processor 330 performs the first in/first out (FIFO) read/write 334 to one of the adjustable size and location first in/first out (FIFOs) buffers 354. After the first in/first out (FIFO) read/write 334 is completely performed, then the first in/first out (FIFO) semaphore #2 344 is released, and the interrupt control circuitry 360 sets the status bit that is located within an interrupt control status register 362.

Subsequently, the interrupt control circuitry 360, using the interrupt control logic circuitry 364, issues an interrupt signal to the programmable media access controller (MAC) 320. When the programmable media access controller (MAC) 320 receives the interrupt signal, it issues the first in/first out (FIFO) read/write 324 command to the bus 310. Subsequently, the semaphore request 326 is made to the semaphore circuitry 340. When the semaphore request 326 is made, the first in/first out (FIFO) semaphore #1 342 is sought. If the first in/first out (FIFO) semaphore #1 342 is granted, then the programmable media access controller (MAC) 320 performs the first in/first out (FIFO) read/write 324 and reads the recently written data contained within the one of the adjustable size and location first in/first out (FIFOs) buffers 354 that has just been written by the control processor 330 above. After the reading is completely performed and all of the data is extracted from the one of the adjustable size and location first in/first out (FIFOs) buffers 354, the status bit contained within the interrupt control status register 362 is cleared, and the first in/first out (FIFO) semaphore #1 342 is released. The control processor 330 and the programmable media access controller (MAC) 320 then wait for a next message associated with any one of the different processes A, B, . . . , 'N' 329 and 339.

Figure 4:
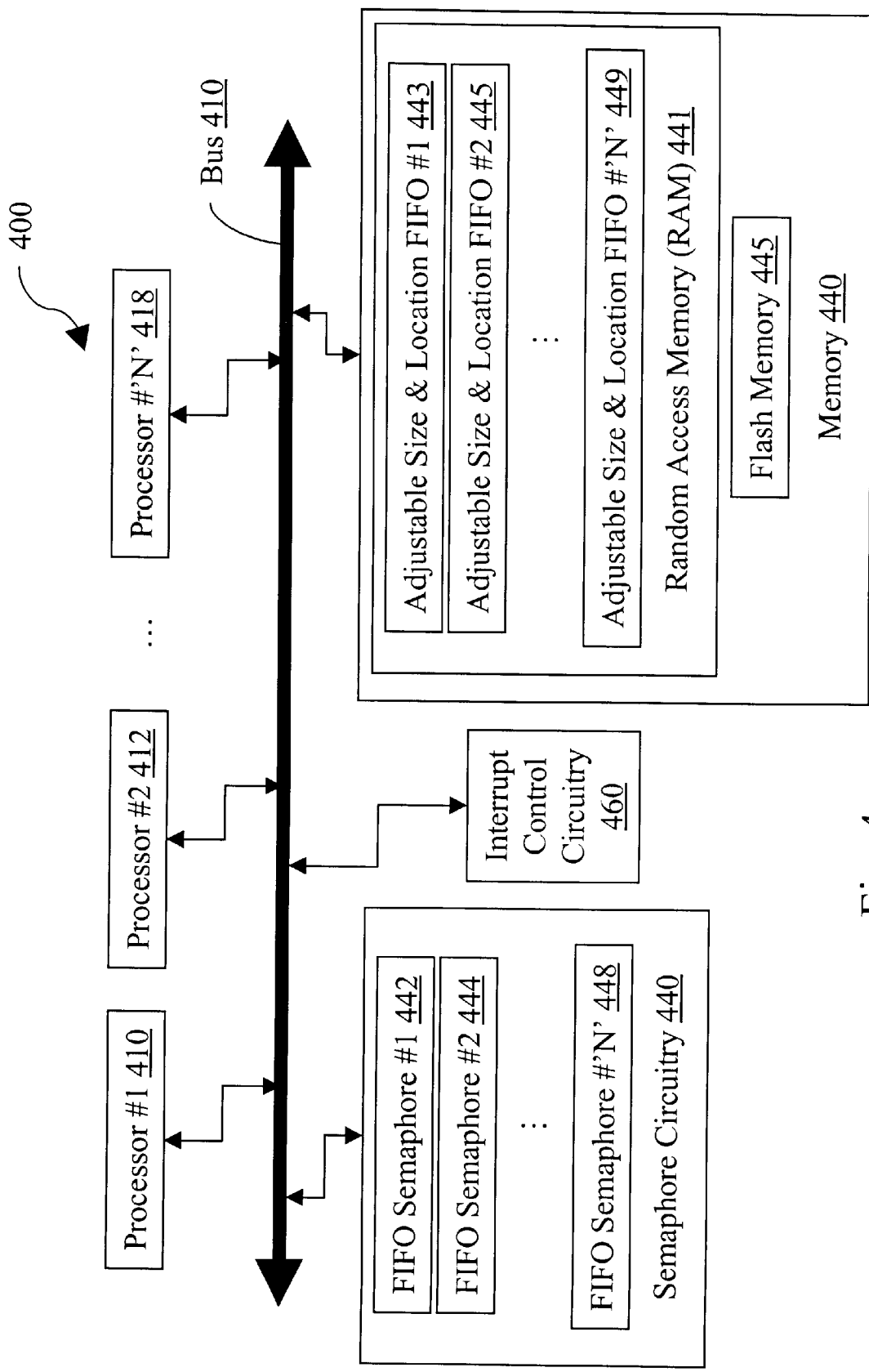
FIG. 4 is a system diagram illustrating an embodiment of a system employing an interrupt driven interface that is operable to couple an indefinite number of processors.

FIG. 4 is a system diagram illustrating an embodiment of a system 400 employing an interrupt driven interface that is operable to couple an indefinite number of processors. The system 400 contains a processor #1 410, a processor #2 412, and a processor #'N' 418. Any number of processors is included within the processors 410–418. Each of the processor #1 410, the processor #2 412, and the processor #'N'

418 is communicatively coupled to the bus 410. In addition, a semaphore circuitry 440, an interrupt control circuitry 460, and a memory 460 are each communicatively coupled to the bus 410. The semaphore circuitry 440 contains a number of first in/first out (FIFO) semaphores, each one corresponding to at least one of the processors 410–418. For example, in certain embodiments of the invention, a first in/first out (FIFO) semaphore #1 442 corresponds to the processor #1 410; a first in/first out (FIFO) semaphore #2 444 corresponds to the processor #2 412; a first in/first out (FIFO) semaphore #'N' 448 corresponds to the processor #'N' 418. In addition, the memory 440 contains, among other things, a flash memory 445 and a random access memory (RAM) 441. The specification by which the processors 410–418 are to communicate with each other in terms of data management, handling, and processing, is stored within the flash memory 445. The flash memory 445 is operable for updating with new specifications in accordance with the present invention. The flash memory 445 is operable to receive the specification from any number of sources, including downloading from an internet connection, downloading from an external/portable media such as a floppy diskette or a CD ROM, or some other type of storage media capable of containing the specification. The random access memory (RAM) 441 itself contains, among other things, a number of adjustable size and location first in/first out (FIFOs) buffers.

Specifically, the random access memory (RAM) 441 contains an adjustable size and location first in/first out (FIFO) buffer #1 443, an adjustable size and location first in/first out (FIFO) buffer #2 445, and an adjustable size and location first in/first out (FIFO) buffer #'N' 449. Each of the adjustable size and location first in/first out (FIFO) buffer #1 443, the adjustable size and location first in/first out (FIFO) buffer #2 445, and the adjustable size and location first in/first out (FIFO) buffer #'N' 449 corresponds to at least one of the processors 410–418. For example, in certain embodiments of the invention, the adjustable size and location first in/first out (FIFO) buffer #1 443 corresponds to the processor #1 410; the adjustable size and location first in/first out (FIFO) buffer #2 445 corresponds to the processor #2 412; and the adjustable size and location first in/first out (FIFO) buffer #'N' 449 corresponds to the processor #'N' 418.

The system 400 is illustrative of the fact that the invention is operable with any number of processors whereby the data management, transfer, and handling is performed in an interrupt driven manner and the data is transferred in a secure and robust manner. The method by which writing and reading is performed between the programmable media access controller (MAC) 320 and the control processor 330 of FIG. 3 is directly extendable to the writing and reading of data between each of the adjustable size and location first in/first out (FIFO) buffer #1 443, the adjustable size and location first in/first out (FIFO) buffer #2 445, and the adjustable size and location first in/first out (FIFO) buffer #'N' 449. Any one of the processors 410–418 is operable to perform data transfer between the others. That is to say, when a write command is to be executed, the same process of securing a semaphore, selected from among the first in/first out (FIFO) semaphore #1 442, the a first in/first out (FIFO) semaphore #2 444, and the first in/first out (FIFO) semaphore #'N' 448, is performed. If the semaphore is granted, then the write command is performed and the data is written into one of the adjustable size and location first in/first out (FIFO) buffer #1 443, the adjustable size and location first in/first out (FIFO) buffer #2 445, or the adjustable size and location first in/first out (FIFO) buffer #'N' 449. When the write is completed, the interrupt control circuitry 460 issues an interrupt to the selected one of the processors 410–418 that is to read the data from the buffer into which the data has just been written. The invention is clearly adaptable to accommodate any number of various processors, and media that constitutes the bus 410 is adaptable as well to accommodate any number of communication media types without departing from the scope and spirit of the invention.

Figure 5B:
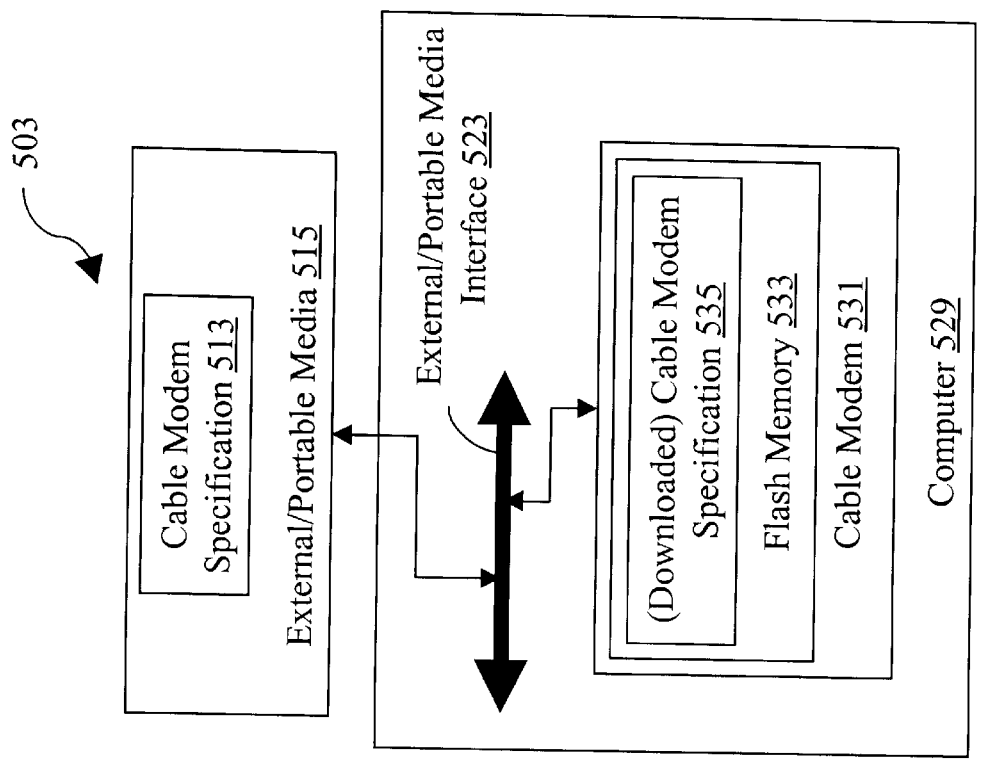
FIG. 5B is a system diagram illustrating an embodiment of a cable modem system built in accordance with the present invention that downloads a cable modem specification using an external/portable media.
Figure 5A:
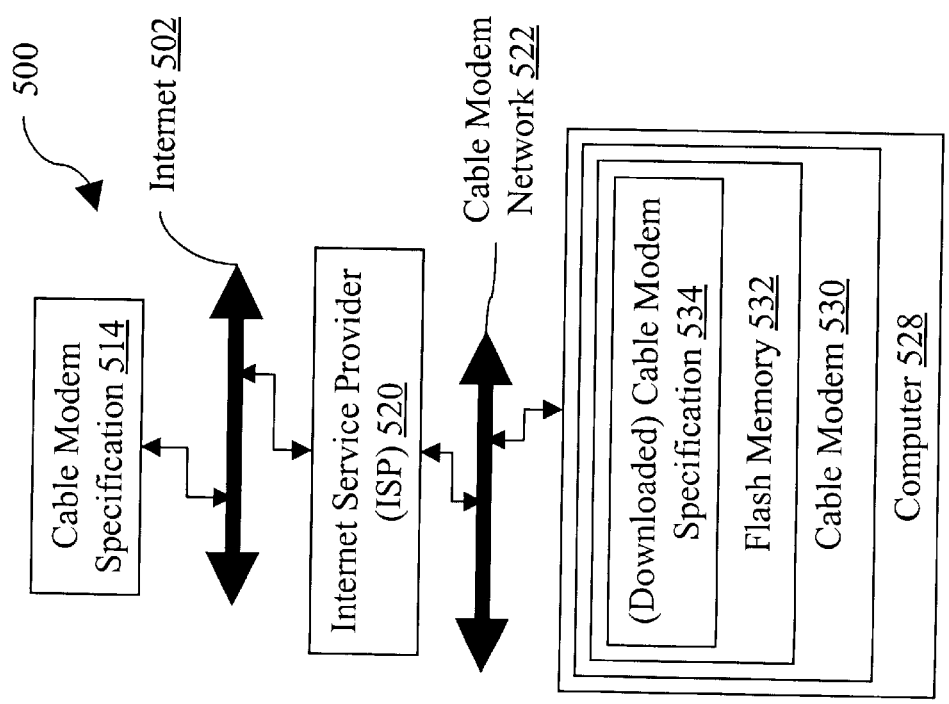
FIG. 5A is a system diagram illustrating an embodiment of a cable modem system built in accordance with the present invention that is coupled to an external network.

FIG. 5A is a system diagram illustrating an embodiment of a cable modem system 500 built in accordance with the present invention that is coupled to an external network. In the specific case of FIG. 5A, the external network is provided by a cable modem network 522 and an internet 502. A computer 528, having a cable modem 530, is communicatively coupled to the internet 502 via the cable modem network 522 and an internet service provider (ISP) 520. The cable modem 530 contains a flash memory 532 that is operable to store a (downloaded) cable modem specification 534. If desired, the (downloaded) cable modem specification 534 is downloaded from a cable modem specification 514 that is contained somewhere on the internet 502. The computer 528 containing the cable modem 530 connects first to the cable modem network 522, and then to the internet 502 via the internet service provider (ISP) 520. The cable modem specification 514 is then extracted from its site on the internet 502 and passed down to the flash memory 532 and is installed in place of the existent (downloaded) cable modem specification 534.

This embodiment of the invention provides for a method to upgrade a new specification to the cable modem from an external network illustrated in this specific case as the internet 502. Any other network is operable in accordance with the present invention without departing from the scope and spirit of the invention. That is to say, the internet 502 is illustrative of a specific type of network to which the computer 528 within the cable modem system 500 is communicatively coupled and from which a cable modem specification may be retrieved. Any number of various types of computers is included within the computer 528, including laptop computers, desktop computers, handheld computers, and mainframe computers. The ability to load a new specification into the flash memory 532 of the cable modem 530 of the computer 528 provides for the functionality of updating the specification by which data management, handling, and transfer is performed between various processors within the computer 528.

FIG. 5B is a system diagram illustrating an embodiment of a cable modem system 503 built in accordance with the present invention that downloads a cable modem specification 513 using an external/portable media 515. A computer 529 itself contains a cable modem 531 having a flash memory 533 in which is stored a (downloaded) cable modem specification 535. The computer contains an external/portable media interface 523 that is operable to communicate with the external/portable media 515. The cable modem specification 513 is passed via the external/portable media interface 523 and is loaded into the flash memory 533 of the cable modem 531. This ability to load a new specification into the flash memory 533 of the cable modem 531 of the computer 529 provides for the functionality of updating the specification by which data management, handling, and transfer is performed between various processors within the computer 529. This manner of handling and downloading the cable modem specification 513, as illustrated in the FIG. 5B, is directly analogous, in some respects, to the method of downloading the cable modem specification 514, as illustrated in the FIG. 5A. In certain embodiments of the invention, both of the embodiments of the invention illustrated within the FIG. 5A and the FIG. 5B are operable within a single computer. That is to say, a single computer is operable to contain functionality of both the computer 528 and the computer 529, in that, a cable modem specification is capable of being downloaded into the flash memory of a cable modem from either an external network or a local external/portable media.

Figure 6:
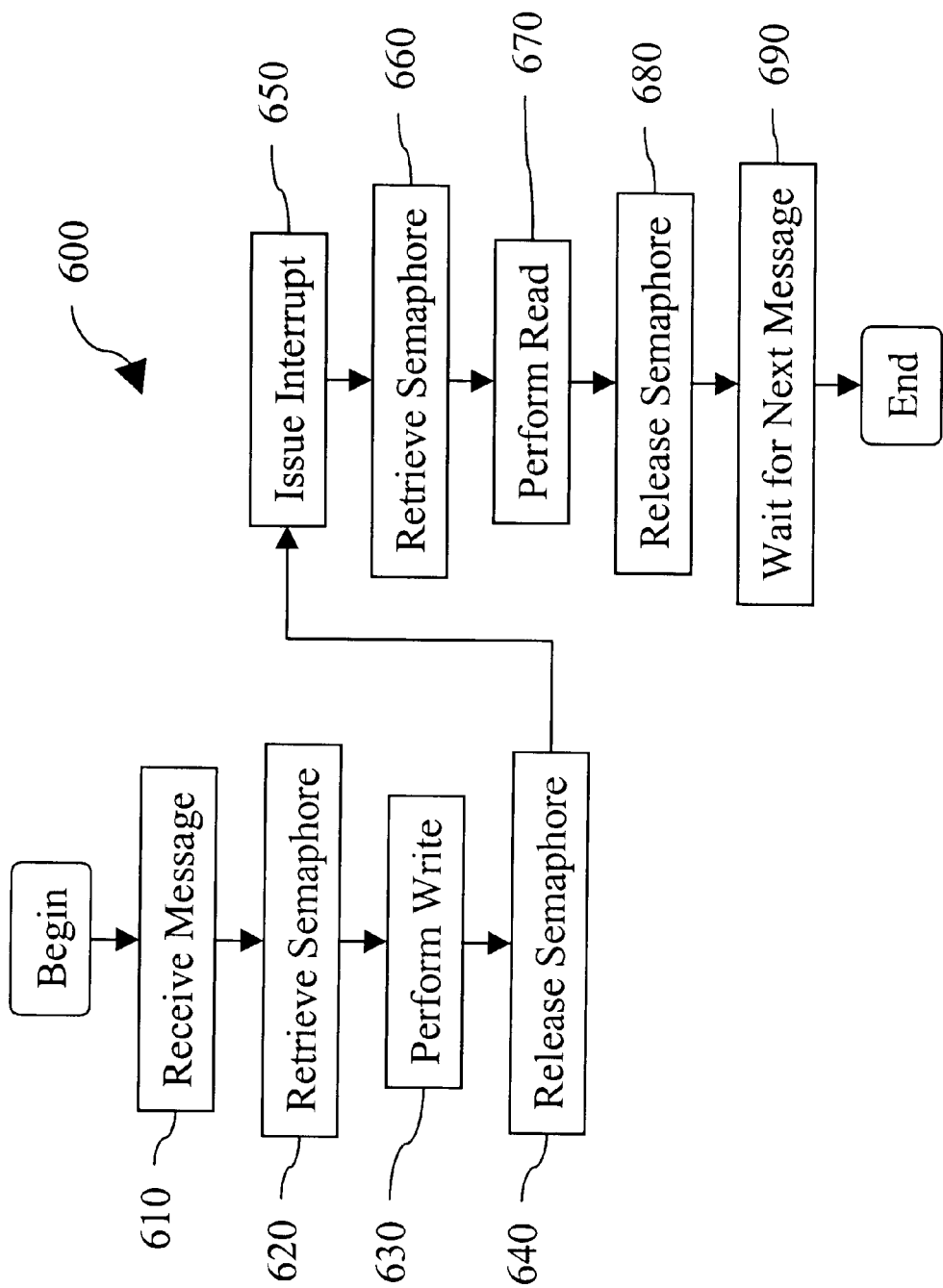
FIG. 6 is a functional block diagram illustrating an embodiment of a flexible method that is operable to interface at least two processors.

FIG. 6 is a functional block diagram illustrating an embodiment of a flexible method 600 that is operable to interface at least two processors. In a block 610, a message is received. Then, a semaphore is retrieved in a block 620 to determine if the function associated with the message received in the block 610 is capable of being performed at the present time. In a block 630, a write function is performed and the semaphore that is retrieved in the block 620 is released. Then, an interrupt is issued in a block 650. After the interrupt is issued, then a semaphore is retrieved in a block 660. The semaphore retrieved in the block 660 is not necessarily the semaphore that is retrieved in the block 620. Then, in a block 670, a read function is performed to read the data that is written in the block 630. After the read is completed in the block 670, the semaphore that is retrieved in the block 660 is released as shown in a block 680. Ultimately, when the write and read of a data, thereby ending its data transfer, the flexible method 600 waits for a next message to be received.

The flexible method 600 is operable within any of the various embodiments illustrated above in FIGS. 1–5. For example, the write and read functions are analogous to the transfer of data between multiple processors as shown in the FIG. 4, or between the programmable media access controllers (MACs) and the control processors as shown in the FIGS. 1–3. In addition, data management, handling, and transfer that is performed within either of the computers 528 and 529 of the FIGS. 5A and 5B are operable in accordance with the flexible method 600.

Figure 7:
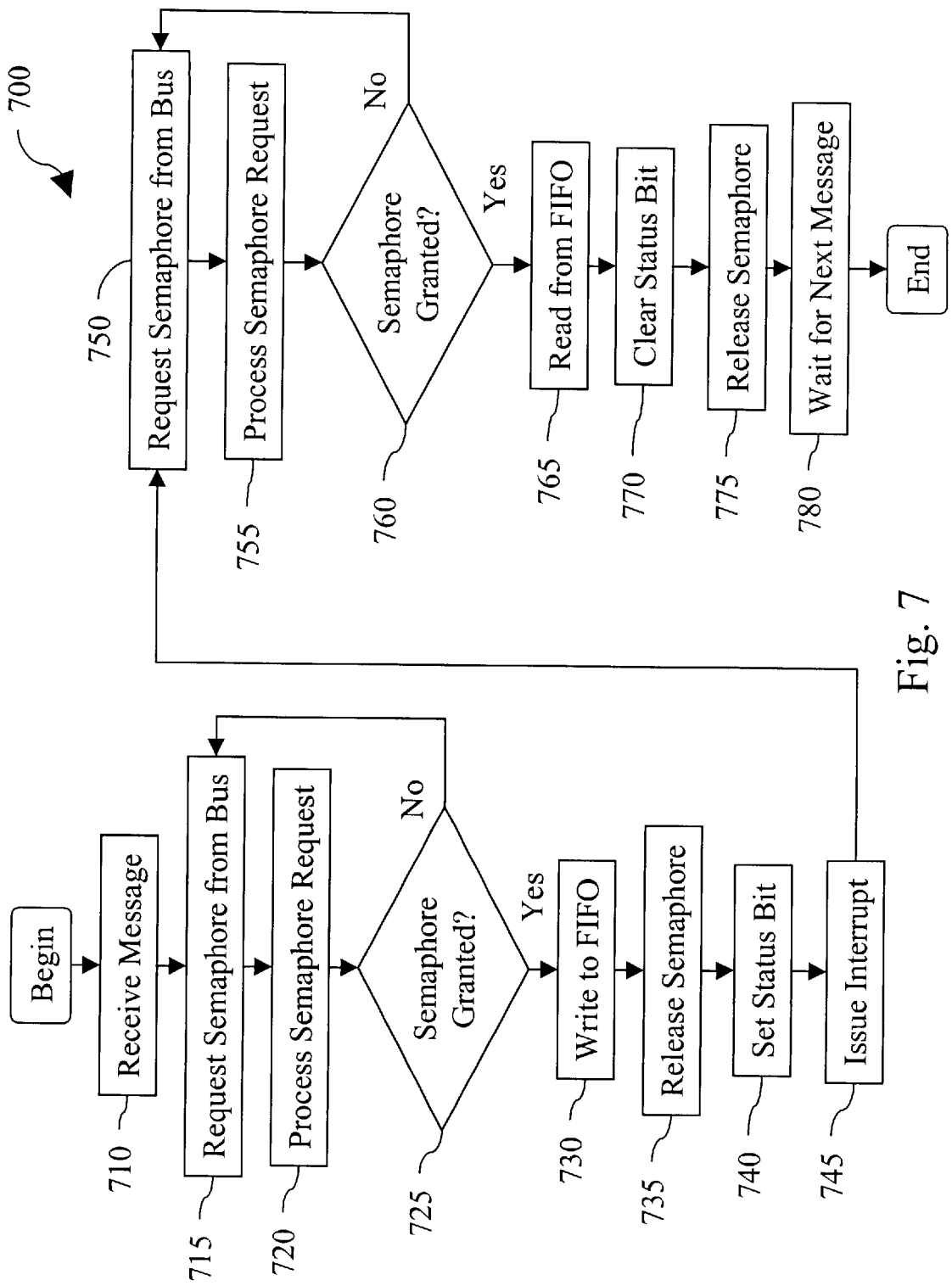
FIG. 7 is a functional block diagram illustrating another embodiment of a flexible method that is operable to interface at least two processors.

FIG. 7 is a functional block diagram illustrating another embodiment of a flexible method 700 that is operable to interface at least two processors. In a block 710, a message is received. In a block 715, a semaphore is requested from a bus. The semaphore request is processed in a block 720. In a decision block 725, it is determined whether the semaphore is granted. If the semaphore not granted, then the semaphore is requested from the bus again in the block 715. If desired, any number of functions are performed to control when and how the semaphore request of the block 715 will be performed upon the denial of the granting of the semaphore as determined in the decision block 725. For example, a simple polling of the availability of the semaphore is performed to determine its availability. Alternatively, a specific time period or number of clock cycles is allowed to pass before the semaphore is attempted to be retrieved again. When the semaphore is granted in the decision block 725, then a write function is performed writing data into a first in/first out (FIFO) buffer. After the writing of all the data is performed into the first in/first out (FIFO) buffer, the semaphore is released in a block 735. A status bit is set in a block 740 indicating that the semaphore has been released. In a block 745, an interrupt signal is issued notifying the proper processor that the data that has been written in the block 730 is ready to be read by the processor into which the data is to be transferred.

To perform a proper read function of the data that has just been written, a semaphore is requested from the bus in a block 750. The semaphore requested in the block 750 is not necessarily the same semaphore that is requested in the block 715. After the semaphore request has been made, the semaphore request is processed in the block 755. In a decision block 760, it is determined whether the semaphore has in fact been granted. If the semaphore has not been granted in the block 760, then the semaphore request is repeated as shown in the block 750. If desired, any number of functions are performed to control when and how the semaphore request of the block 750 will be performed upon the denial of the granting of the semaphore as determined in the decision block 760. For example, a simple polling of the availability of the semaphore is performed to determine its availability. Alternatively, a specific time period or number of clock cycles is allowed to pass before the semaphore is attempted to be retrieved again. If the semaphore is indeed granted as determined in the decision block 760, then the data that has been written is then read from the first in/first out (FIFO) buffer in a block 765. When the reading of the data from the first in/first out (FIFO) buffer is completed in the block 765, then the status bit that is set in the block 740 is subsequently cleared in a block 770. The semaphore is then released in a block 775 and the flexible method 700 waits until the reception of a next message in a block 780.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A cable modem system that interfaces at least two processors to transfer data between the at least two processors, the cable modem system comprising:
    a first processor;
    a second processor;
    a memory that stores a specification within a first portion of the memory, the specification governs the transfer of the data between the first processor and the second processor, one of the first processor and the second processor writes the data to a second portion of the memory;
    a semaphore circuitry determines which of the first processor and the second processor writes the data to the second portion of the memory;
    an interrupt control circuitry that notifies the other of the first processor and the second processor to read the data from the second portion of the memory; and
    a bus that communicatively couples the first processor, the second processor, the semaphore circuitry, the interrupt control circuitry, and the memory.

2. The cable modem system of claim 1, wherein the memory is, at least in part, a flash memory; and
    the specification is stored within the flash memory.

3. The cable modem system of claim 1, wherein the memory is, at least in part, a random access memory, the random access memory is partitioned into a plurality of buffers, each of the plurality of buffers having a size and a location.

4. The interrupt driven interface of claim 3, wherein the size and the location of each of the plurality of buffers is adjustable to conform with the specification.

5. The cable modem system of claim 1, wherein the specification is loaded into the memory using an external and portable media.

6. The cable modem system of claim 1, wherein the first processor and the second processor are embedded within a single circuitry.

7. The cable modem system of claim 1, wherein the first processor is contained within a cable modem;
   the second processor is contained within a peripheral device; and
   the bus communicatively couples the cable modem and the peripheral device.

8. The cable modem system of claim 1, wherein each of the first processor and the second processor is operable to perform a plurality of processes, each process being defined by the specification.

9. A cable modem system for providing an external system access to a cable data transmission medium comprising:
   a media access controller;
   a processor;
   a memory;
   semaphore circuitry determining which of the media access controller and the processor writes the data to the memory;
   interrupt control circuitry notifying the other of the media access controller and the processor to read the data from the memory upon completion of writing; and
   a bus that communicatively couples the media access controller, the processor, the semaphore circuitry, the interrupt control circuitry, and the memory.

10. The cable modem system of claim 9, further comprising a specification within a first portion of the memory, the specification governs the transfer of the data between the media access controller and the processor, one of the media access controller and the processor writes the data to a second portion of the memory.

11. The modem system of claim 9 wherein the media access controller further comprises a configurable message processor.

12. The modem system of claim 9 wherein the media access controller further comprises a message processor that is configured according to the specification.

13. The modem system of claim 9 wherein the interrupt control circuitry further comprises interrupt control logic that determines when one of the media access controller and the processor has completed writing to the memory and generates an interrupt to the other of the media access controller and the processor.

14. The modem system of claim 13 wherein the interrupt is an inter-processor interrupt.

15. The modem system of claim 13 wherein the processor is a control processor of the cable modem system.

16. The modem system of claim 9 wherein the interrupt control circuitry further comprises:
   an interrupt control status register; and
   interrupt control logic that determines when one of the media access controller and the processor has completed writing to the memory based on the status of the interrupt control status register.

17. A cable modem system for providing an external system access to a cable data transmission medium comprising:
   a media access controller;
   a control processor;
   a memory coupled to the media access controller and the control processor, one of the media access controller and the control processor writing to the memory; and
   interrupt control circuitry coupled to the media access controller and the control processor, the interrupt control circuitry notifying the other of the media access controller and the control processor to read the data from the memory upon completion of writing.

18. The modem system of claim 17 wherein the media access controller is configurable according to a specification.

19. The modem system of claim 17 wherein the interrupt control circuitry generates an inter-processor interrupt upon the completion of writing.

\* \* \* \* \*